Jan. 1, 1957

A. J. MARINO, JR 2,776,131

ZONE REFINING BOAT

Filed Aug. 21, 1953

INVENTOR
ANTHONY J. MARINO, JR.
BY
ATTORNEY

United States Patent Office 2,776,131

Patented Jan. 1, 1957

2,776,131

ZONE REFINING BOAT

Anthony J. Marino, Jr., Weehawken, N. J., assignor to International Telephone and Telegraph Corporation, Nutley, N. J., a corporation of Maryland Application August 21, 1953, Serial No. 375,732

1 Claim. (Cl. 263—47)

This invention relates to an improved graphite boat construction for use in metallurgical processes. It is more particularly directed to the structural form of a graphite boat suitable for the preparation of crystalline material of high purity for use in semiconductor devices.

Crystals of various chemical elements and compounds such as germanium, silicon, selenium, copper sulfide, copper oxide, lead sulfide, lead selenide, lead telluride, aluminum antimonide and the like are used in semiconductor devices, which are assuming a role of increasing importance in the electronic industry. Of particular importance are the semiconductor devices containing germanium. This element, either in the pure state or alloyed with other elements, is now extensively used in crystal diodes and in crystal triodes or transistors. It has been found that in order to obtain germanium-containing semiconductor devices having reproducible properties, satisfactory reliability and reasonably satisfactory electrical characteristics, such as gain, noise figure, frequency range and power, the germanium used must be of a high degree of purity. It is also highly important with respect to obtaining uniform electrical properties than any foreign or solute atoms present, either as a result of contamination or by intentional introduction as part of an alloying process, should be uniformly distributed within the germanium. It has furthermore been found that for certain applications, the germanium used in these semiconductor devices should be obtained from a single crystal of germanium, that is, germanium with no intercrystalline boundaries present. The use of single-crystal material is particularly important in the preparation of various types of germanium crystal triodes such as point contact transistors and junction transistors. A necessary preliminary step, however, prior to the preparation of monocrystalline material, is the obtaining of the germanium in a high state of purity.

Germanium is commercially available usually in the form of the element, the dioxide, or the tetrachloride. When the material is obtained in other than the elemental form, it is first converted to the oxide which is then reduced in a suitable atmosphere to the metal.

One method of purifying the germanium, that of normal freezing, is to melt the material and then allow it to solidify at a slow rate, with solidification starting at one end and progressing uniformly along the ingot. The impurities present tend to be concentrated in the last portion to freeze. Remelting and refreezing, after cropping off the solute-rich portion, will lead to further purification.

The procedure of zone-refining or zone-melting is a further improvement over normal freezing techniques. In the zone-refining method, a multicrystalline bar, usually maintained in a horizontal position, is passed through a series of heaters and thereby a number of molten zones are made to traverse the crystalline material. This semiconductor material is generally melted in a shallow vessel composed of a suitable refractory material, such as quartz or graphite. Where germanium is the semiconductor material, the use of graphite of a high spectroscopic purity has been found to be noncontaminating to the germanium.

In the usual procedure, an ignot of pure germanium metal is placed in a boat made of essentially spectroscopically pure graphite, and this boat is drawn through a furnace containing several narrow, regularly spaced heated zones. A furnace consisting essentially of copper induction heating coils surrounding a horizontal quartz tube is usually used for this purpose. Within the central portion of the induction heating coil the temperature is maintained above the melting point of the germanium. In the region between the several coils, the temperature is below the freezing point of germanium. Therefore, continuous melting and freezing occur at each zone through which the germanium is passing. Effectively, then molten zones traverse the germanium from the leading end of the boat to the stern of the boat, carrying an increasing concentration of impurities along with it. These impurities are then concentrated in a narrow channel in the trailing end of the boat. A theoretical discussion of the principles involved in zone-refining may be found in "Principles of Zone Melting," by W. G. Pfann, which appeared in "Transactions of the American Institute of Metals," for July 1952, pages 747 to 753.

I have found, however, that from a practical point of view a definite gap exists between the known theoretical principles involved in zone-refining and the economical and successful utilization of these principles in the preparation of germanium of a high degree of purity. I have discovered that the design of the graphite boat used is a highly critical one for the success of the zone-refining procedure. Because of the poor design of graphite furnace boats as ordinarily available, an uneconomical and incomplete purification of the germanium is obtained. Where these boats are used with existing techniques, several passages through the furnace are required before the desired degree of purity of the semiconductor material is attained. In addition, because of the non-uniform absorption of heat by different parts of the boat, the molten zones traversing the germanium ingot tend to change their size and become diffused, with a consequent undesirable spread of impurities in the ingot rather than a successful concentration of these impurities at one end of the ingot. Furthermore, because of the design of existing boats, the purified germanium is produced in a form unsatisfactory for resistivity testing without resorting to grinding of the ingots with the consequent possibility of contamination in addition to the loss of valuable material.

It is an object of the present invention, therefore, to provide an improved furnace boat for the purification of semiconductor material. It is a further object to provide an improved graphite boat for the preparation of purified germanium material by the zone-refining process. It is still an additional object to produce purified germanium ingots in a form suitable for resistivity testing without resorting to expensive additional processing of the germanium. Other objects and features of this invention will be seen from the following drawing, in which.

It is an important feature of the structural form of this boat that the cross-sectional mass thereof be maintained substantially uniform throughout the length of the boat.

Figure 1:
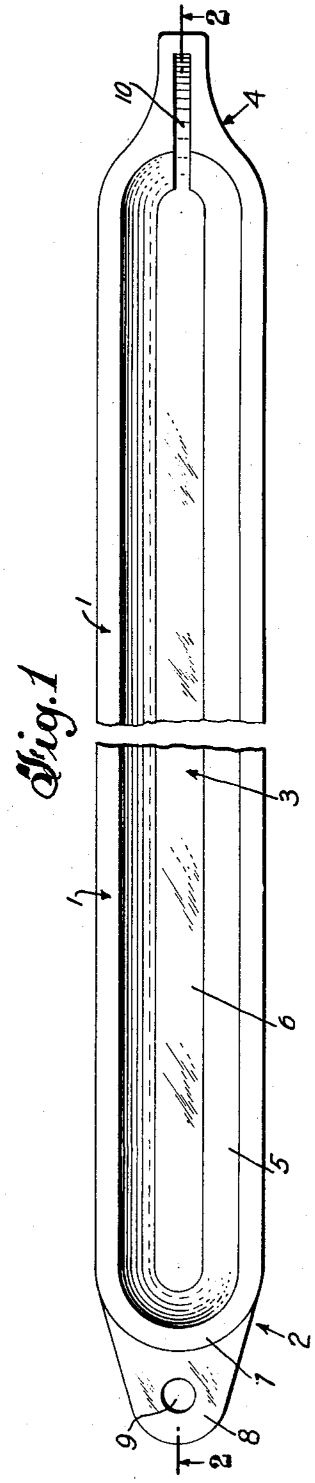
Fig. 1 is a top plan view of the zone-refining boat.
Figure 2:
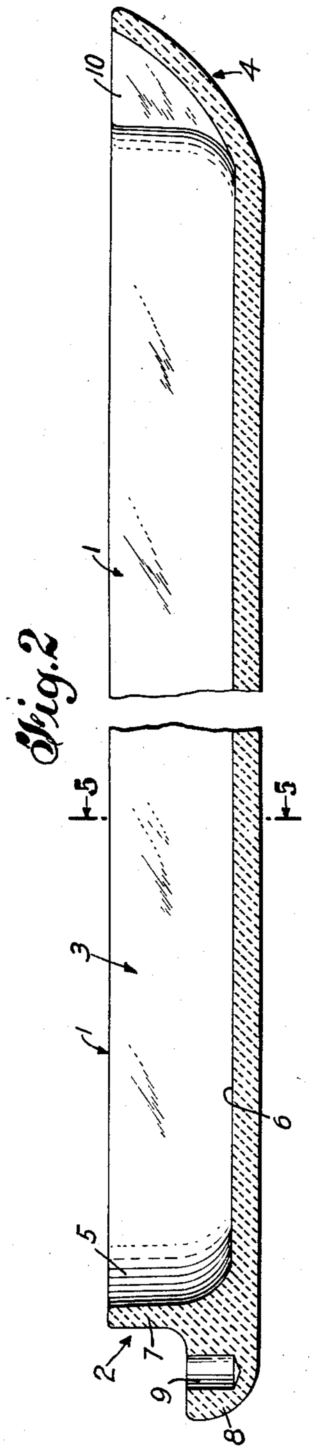
Fig. 2 is a sectional view of this boat taken along the lines 2—2 of Fig. 1.
Figure 4:
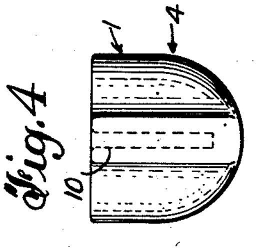
Fig. 4 is an end view in elevation of the trailing end or stern of this boat.
Figure 5:
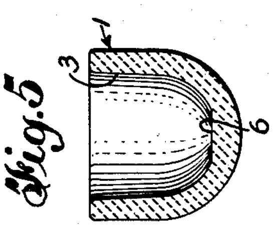
Fig. 5 is a sectional view of the boat taken along the lines 5—5 of Fig. 2.
Figure 3:
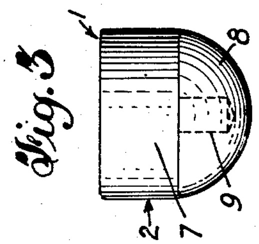
Fig. 3 is an end view in elevation of the leading end or bow of this boat.

Referring to Figs. 1 and 2, the elongated vessel 1 shown therein comprises a bow 2, middle section 3 and stern 4. The bottom and side walls of the middle section define a trough 5 which contains the semiconductive material. The bottom wall 6 of this trough has an internal flat area which extends for substantially the length of the trough. It should be noted that the cross-sectional mass of the middle section 3 is substantially uniform throughout its length. The side and bottom walls of this middle section are generally U-shaped in cross section as may be seen by reference to Fig. 5. Referring to Figs. 2 and 3, the bow section is seen to include an end wall 7 for the trough and a forward extension 8 having a vertical thickness greater than its bottom wall, the cross-sectional mass of this forward extension 8 being decreased gradually forward of this end wall. An opening 9 is provided in the forward section of the boat for insertion of a quartz pull rod for drawing the boat through the zone-refining apparatus. A narrow channel 10 has been provided at the stern end of the boat as may be seen by reference to Figs. 1, 2 and 4. Since this channel is located in the trailing end of the boat, it contains the portion of germanium that is last to freeze, which is wherein most of the impurities originally present are concentrated. Hence, in further purifying the germanium ingot this narrow section containing the concentrated impurities may be conveniently broken from the germanium bar following its solidification.

In the previous construction of graphite furnace boats, the ends of the boat were large and bulky and considerably thicker in mass than the average cross section of the central portions of the boat. As a consequence, when the front end of the boat passed through a heated area in the furnace an excess amount of current was drawn by this thicker end, whereby heat was removed from one or more adjacent zones of germanium in the boat, resulting in improper purification of germanium in such zones. Because of this, in order to compensate for this unbalanced current condition, it was found necessary heretofore to increase the size of one or more of the other zones. However, this in effect lost part of the zone-refining advantage. As may be seen by reference to the drawing, there are no large bulky ends present in my improved graphite boat. Instead, the cross-sectional masses of the wall structures of the bow and stern sections terminating the trough of the middle section have been decreased gradually from the uniform cross-sectional mass of the middle section. The leading edge of the boat has been made as uniform in cross section as is possible while still making provision for the opening 9 in which a quartz rod is placed to pull the boat through the heating coils. The bottom surface 6 of the boat has been made completely flat so that the finished ingot is provided with a flat surface lengthwise thereof suitable for evaluation in existing testing equipment without further modification. This serves to eliminate the necessity for grinding the ingot flat and hence leads to a marked saving in man hours of labor, in germanium, and in equipment costs, as well as eliminating the possibility of contaminating the germanium.

The following is an example of a typical run, given for purposes of illustration only, without in any sense being limited thereto.

A boat fabricated from spectroscopic-grade graphite is used. By spectroscopic-grade graphite, reference is made to graphite of the highest purity commercially available, as used, for example, for spectrographic electrodes. Such spectroscopic graphite is commercially available from United Carbon Products Company, Bay City, Michigan. The over-all outside dimensions of the boat are 13$\frac{13}{16}$ inches in length, 1$\frac{5}{16}$ inches in width, and 1$\frac{3}{16}$ inches in height. The side wall thickness is $\frac{3}{16}$ inch with a two-degree taper on all inside surfaces for easy removal of the germanium ingot from the graphite boat. The inside depth is $\frac{31}{32}$ inch with an inside width of $\frac{15}{16}$ inch and a flat-bottom portion $\frac{3}{8}$ inch in width. Into this boat is placed an ingot of germanium obtained from a previous reduction of germanium dioxide. This ingot is approximately 500 grams in weight and preshaped by the previous reduction operation to the contours of the graphite boat.

For the melting furnace, an induction-heated quartz tube furnace is used. This quartz tube is approximately 4½ feet in length with an inside diameter of 2 inches. The heating unit consists of six coils spaced at intervals of 4 inches. Each coil is made up of four turns of ¼-inch outside diameter copper tubing, with a mean coil diameter of 2½ inches and an axial length of 1⅛ inches. The high-frequency generator used is capable of supplying 25 kilowatts by stepless power control.

The 4-foot-long quartz pull rod used for pulling the graphite boat through the quartz furnace is supported by a rail and attached to a steel wire. A driving motor, with a capstan capable of wrapping the steel wire at a rate of 9.6 inches per hour, and associated pulleys are used for pulling the quartz rod.

In practice the germanium bar from the reduction process is placed in the graphite boat, and the boat and contents are placed in the quartz tube of the zone refiner. The boat is placed so that the leading end of the germanium bar is just entering the first radio-frequency heating coil. An inert atmosphere of nitrogen or helium is maintained within the quartz tube. When the tip of the germanium bar in the heating zone is completely molten, the pulling mechanism is started and the boat is pulled through the quartz tube at a uniform rate of 0.16 inch per minute, equivalent to a total time of 4 hours and 10 minutes. During the heating process, the filament current of the radio-frequency generator is regulated so that the germanium in the heated zone is molten, at the same time keeping the molten zone as narrow as possible.

Upon completion of the run, when the extreme end of the bar is molten, the pulling and heating mechanisms are shut off and the boat and contents cooled inside of the quartz tube for at least half an hour.

In general, the impurities I desire to eliminate are those whose $k$ values are less than one. By $k$ value, I refer to the distribution coefficient, the equilibrium ratio of the concentration of solute in the solid to the concentration of solute in the liquid. For a $k$ value of less than one, the presence of solute lowers the freezing point, and the solute is concentrated in the last portions to freeze or the trailing end of the bar.

Because of the fact that impurities present in trace quantities are being dealt with, in quantities of the order of one part per million and less, ordinary chemical methods of analysis are unsuitable for determining impurity concentrations. Measurements of the volume resistivity of the germanium are required for impurity concentration determination. For accurate determination of the volume resistivity it is essential that the germanium bar be of uniform cross section. By designing the graphite boat with a flat bottom, no grinding of the germanium ingot is necessary. Since each and every ingot must be electrically evaluated and its volume resistivity determined, this avoidance of additional treatment of the germanium results in a marked saving of material and time.

I have found that at the trailing end of the germanium, where most of the impurities are concentrated, the resistivity is of the order of zero ohm-cm. For a uniform central portion, volume resistivities of 55–60 ohm-cm. are obtained. For pure germanium, the intrinsic value of the volume resistivity of germanium is 65 ohm-cm. The foregoing resistivity values are determined at a temperature of 20° C.

While I have described above the principles of my invention in connection with specific apparatus and method steps, it is to be clearly understood that this description is made only by way of example and not as a limitation to the scope of my invention as set forth in the objects thereof and in the accompanying claim.

I claim:

An elongated graphite vessel for the purification of germanium by a zone-refining process comprising bow, middle and stern sections, said middle section including a major portion of the length of said vessel and having bottom and side walls defining a trough, the bottom wall having a flat area extending for substantially the length of such trough, the inner surfaces of the side walls of said middle section flaring outwardly and upwardly, the side and bottom walls of said middle section being generally U-shaped in cross section and having a cross-sectional mass and a cross-sectional wall thickness substantially uniform throughout its length, said bow and said stern sections each having a wall structure terminating the trough of said middle section, the cross-sectional mass and cross-sectional wall thickness of each such wall structure being decreased gradually from the uniform cross-sectional mass and cross-sectional wall thickness of said middle section, the wall structure of said bow section including an end wall for said trough and a forward extension having a vertical thickness greater than said bottom wall, the cross-sectional mass of said forward extension being decreased gradually forwardly of said end wall, the wall structure of said stern section including an end wall for said trough and a rearwardly extending portion, the cross-sectional mass of said rearwardly extending portion being decreased gradually rearwardly of said last-mentioned end wall, the rearward extension of said stern section further including a narrow channel decreasing in depth rearwardly and having its deepest end in communication with the trough of said middle section.

References Cited in the file of this patent

UNITED STATES PATENTS

| | | |
|---|---|---|
| 1,157,794 | Miller | Oct. 26, 1915 |
| 2,072,817 | Hostetler | Mar. 2, 1937 |
| 2,391,182 | Misfeldt | Dec. 18, 1945 |
| 2,593,015 | Dreher | Apr. 15, 1952 |

OTHER REFERENCES

Catalog Section M–8000–A Carbon and Graphite Products, TN 455 G7N3, 1944, page 15 relied on.

Vitresoil, Apparatus For Chemical Laboratories, copyright 1915. The Thermal Syndicate, New York, page 16 relied on.

"Principles of Zone-Melting," W. G. Pfann, Journal of Metals, pages 747–753, July 1952.